(12) United States Patent
Arms et al.

(10) Patent No.: US 10,545,769 B2
(45) Date of Patent: Jan. 28, 2020

(54) SYSTEM AND METHOD FOR CONSTRUCTIVE BIFURCATION OF I/O UNIT PORTS IN AN INFORMATION HANDLING SYSTEM

(71) Applicant: Dell Products, LP, Round Rock, TX (US)

(72) Inventors: Michael W. Arms, Pflugerville, TX (US); Anand P. Joshi, Round Rock, TX (US); Justin L. Frodsham, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 133 days.

(21) Appl. No.: 14/871,659

(22) Filed: Sep. 30, 2015

(65) Prior Publication Data

US 2017/0090949 A1    Mar. 30, 2017

(51) Int. Cl.
  *G06F 13/42*   (2006.01)
  *G06F 9/44*   (2018.01)
  *G06F 9/4401*   (2018.01)

(52) U.S. Cl.
  CPC ........ *G06F 9/4411* (2013.01); *G06F 9/4403* (2013.01); *G06F 13/4282* (2013.01)

(58) Field of Classification Search
  USPC ........................................ 710/10, 104; 713/2
  See application file for complete search history.

(56) References Cited

U.S. PATENT DOCUMENTS

| | | | |
|---|---|---|---|
| 8,065,509 B2 | 11/2011 | Wang et al. | |
| 8,634,424 B2 | 1/2014 | Julian et al. | |
| 2006/0123165 A1* | 6/2006 | Narad | G06F 13/4081 710/104 |
| 2006/0179197 A1* | 8/2006 | Chung | G06F 12/0831 710/242 |
| 2007/0162733 A1 | 7/2007 | Dennis et al. | |
| 2007/0180175 A1* | 8/2007 | Hedin | G06F 13/405 710/106 |
| 2007/0186088 A1* | 8/2007 | Khatri | G06F 13/4018 713/1 |
| 2009/0063741 A1* | 3/2009 | Lu | G06F 13/409 710/301 |
| 2010/0161942 A1 | 6/2010 | Bishop et al. | |
| 2011/0040916 A1* | 2/2011 | Atherton | G06F 13/4295 710/300 |
| 2012/0260015 A1 | 10/2012 | Gay et al. | |

(Continued)

*Primary Examiner* — Ilwoo Park
(74) *Attorney, Agent, or Firm* — Larson Newman, LLP

(57) ABSTRACT

A method performed by an information handling system, the method including bifurcating, by a processor of the information handling system, an I/O unit (IO unit) of the information handling system into a first root port and a second root port, wherein the first root port comprises a first pre-determined number of first lanes of the IO unit and the second root port comprises the first pre-determined number of second lanes of the IO unit. The method further including discovering, by the processor, a first I/O device (IO device) coupled to the IO unit, wherein the first IO device utilizes a first lane width that is greater than the first pre-determined number of lanes, and in response to discovering the first IO device, bifurcating, by the processor, the IO unit into a third root port, wherein the third root port comprises the first lanes and the second lanes.

10 Claims, 4 Drawing Sheets

(56) References Cited

U.S. PATENT DOCUMENTS

| | | | |
|---|---|---|---|
| 2014/0297915 A1* | 10/2014 | Wu | G06F 13/4068 710/313 |
| 2015/0324312 A1* | 11/2015 | Jacobson | G06F 13/4022 710/104 |
| 2016/0034413 A1* | 2/2016 | Park | G06F 13/4027 710/105 |
| 2018/0081847 A1* | 3/2018 | Parthasarathy | G06F 9/4403 |

* cited by examiner

SYSTEM AND METHOD FOR CONSTRUCTIVE BIFURCATION OF I/O UNIT PORTS IN AN INFORMATION HANDLING SYSTEM

FIELD OF THE DISCLOSURE

This disclosure generally relates to information handling systems, and more particularly relates to a system and method for constructive bifurcation of I/O unit (IO unit) ports in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems. An information handling system includes a wide variety of processing elements, devices, input output adapters, and fabric input output modules, that can be initially configured in the information handling system and/or dynamically added to the information handling system. An information handling system can include a processor having I/O units that allow I/O devices to be connected to the processor via the I/O units. The processor can execute a Built-In Operating System (BIOS) that perform a configuration of the I/O units based on pre-configuration information built in to the BIOS to allow the I/O devices to operate.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, the information handling system can include processing resources for executing machine-executable code, such as a Central Processing Unit (CPU), a Programmable Logic Array (PLA), an embedded device such as a System-On-a-Chip (SoC), or other control logic hardware. The information handling system can also include one or more computer-readable medium for storing machine-executable code, such as software or data. Additional components of the information handling system can include one or more storage devices that can store machine-executable code, one or more communications ports for communicating with external devices, and various Input and Output (I/O) devices, such as a keyboard, a mouse, and a video display.

Figure 1:
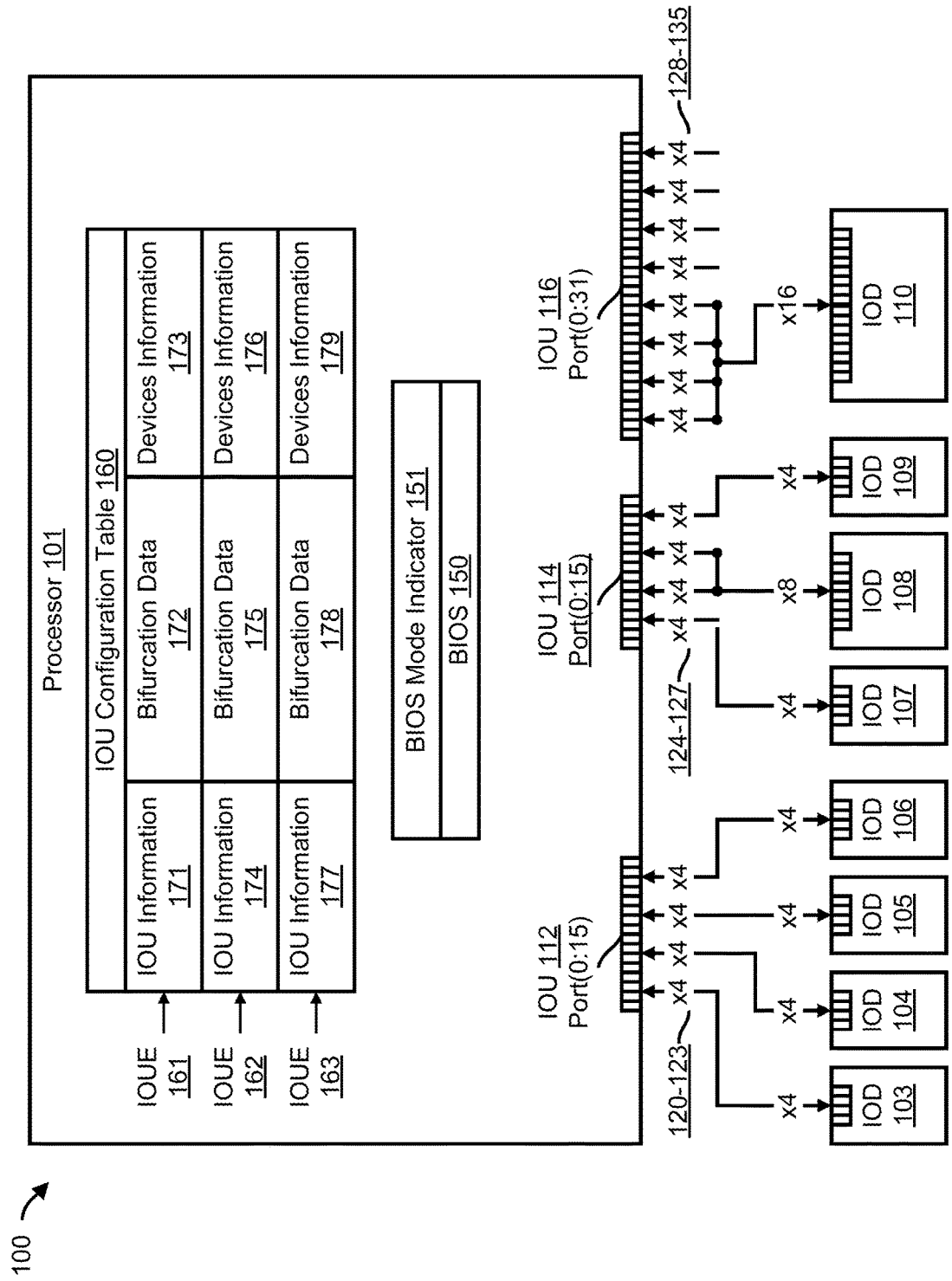
FIG. 1 is a block diagram illustrating an information handling system for constructive bifurcation of I/O unit (IO unit) ports according to an embodiment of the present disclosure.
Figure 2:
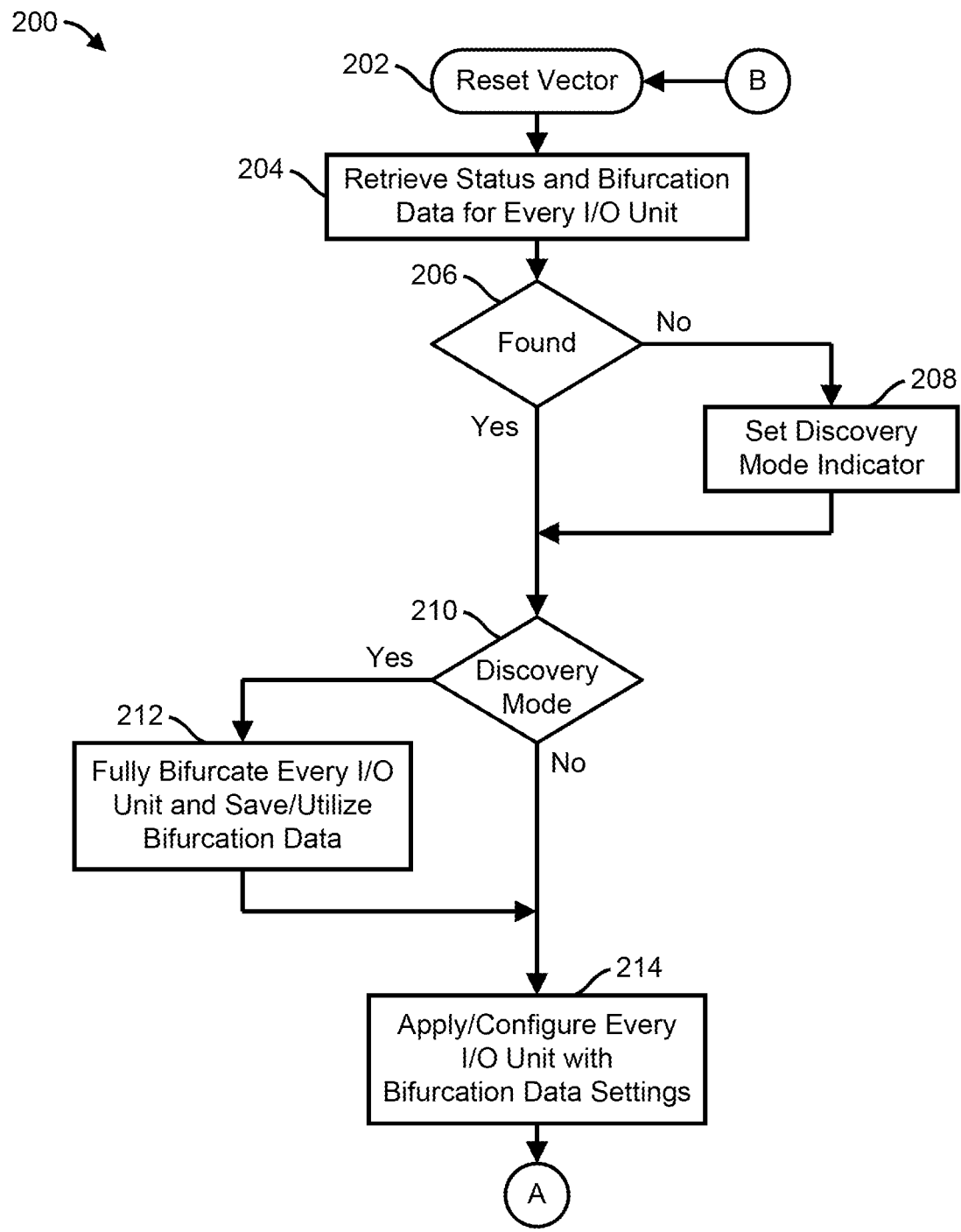
FIGS. 2 and 3 illustrate a method for constructive bifurcation of I/O unit (IO unit) ports in an information handling system according to an embodiment of the present disclosure.
Figure 3:
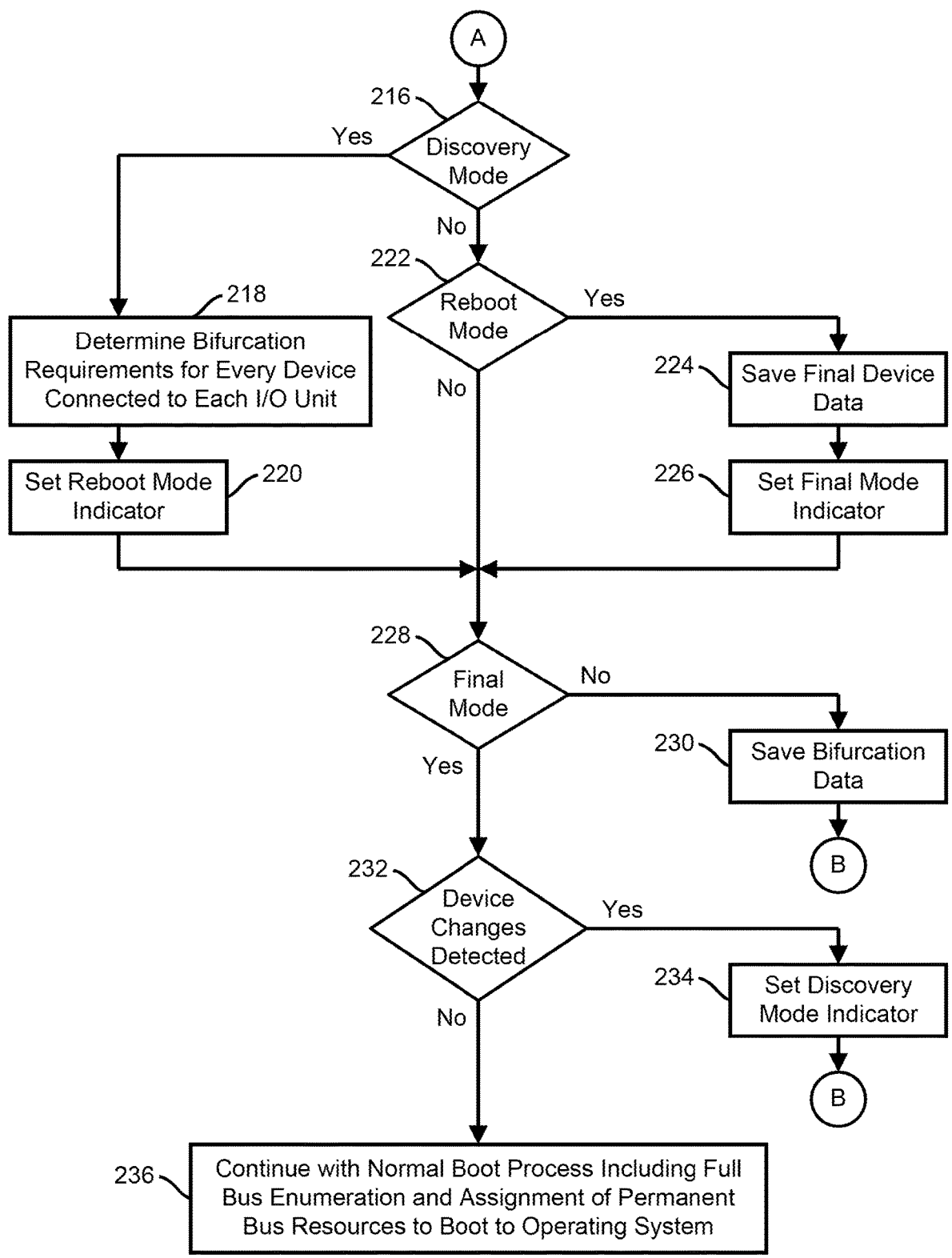

FIGS. 1-3 illustrate an information handling system and a method for constructive bifurcation of I/O unit (IO unit) ports, according to an embodiment of the present disclosure.

FIG. 1 is a simplified diagram of an information handling system (IHS) 100 that includes a processor 101, and I/O devices 103-110. Processor 101 and IO devices 103-110 are connected to each other by interconnects 120-135. Processor 101 and IO devices 103-110 communicate with each other via the interconnects. IHS 100 is operable to perform constructive bifurcation of I/O unit ports of processor 101 to dynamically configure the IO units based on the specific IO devices 103-110 that are connected to each IO unit and on device information associated with each of IO devices 103-110, as described in further detail below. Additional processors, IO units, IO devices, and interconnects may be added as needed or desired.

Processor 101 includes an IO unit 112 having a 16 lane configurable port and interconnects 120-123, an IO unit 114 having a 16 lane configurable port and interconnects 124-127, an IO unit 116 having a 32 lane configurable port and interconnects 128-135, a Basic Input/Output System (BIOS) 150, a BIOS mode indicator 151, and an IO unit configuration table 160.

An example of IO units 112, 114, and 116 includes a Peripheral Component Interconnect Express (PCIe) unit, a slotted I/O unit that is dynamic in nature, and the like. As such, IO units 112, 114, and 116 support various IO devices to be connected to IO units 112, 114, and 116. Although IO units 112, 114, and 116 are illustrated as having 16 and 32 lane configurable ports, IO units 112, 114, and 116 are not limited to these number of lanes and may have ports that have 1 to 64 lanes or more.

Interconnects 120-123 each represent 4 lanes of the configurable port of IO unit 112 (as depicted by the "×4" symbol on the interconnects). As such, interconnect 120 is connected to the first 4 lanes of configurable port(0:3) of IO unit 112, interconnect 121 is connected to the second 4 lanes of configurable port(4:7) of IO unit 112, interconnect 122 is connected to the third 4 lanes of configurable port(8:11) of IO unit 112, and interconnect 123 is connected to the fourth 4 lanes of configurable port(12:15) of IO unit 112. Similarly, interconnects 124-127 each represent 4 lanes of the configurable port of IO unit 114, and interconnects 128-135 each represent 4 lanes of the configurable port of IO unit 116. The interconnect widths of Interconnects 120-135 are not limited to an interconnect width of 4 lanes and may have an interconnect width of 1-64 lanes and wider that match the capabilities of each IO unit 112, 114, and 116, as needed or desired.

An example of IO devices 103-110 includes a PCIe device, a slotted device that is dynamic in nature, another device that is supported by IO units 112, 114, and 116, and the like. IO devices 103-106 each have 4 lanes (as depicted by the "×4" symbol on the interconnects) and are connected to IO unit 112 via interconnects 120-123, respectively. IO device 107 has 4 lanes and connected to IO unit 114 via interconnect 124. IO device 108 has 8 lanes and is connected to IO unit 114 via combined interconnects 125 and 126. IO device 109 has 4 lanes and is connected to IO unit 114 via interconnect 127. IO device 110 has 16 and is connected to IO unit 116 via combined interconnects 128-131. Although IO devices 103-110 are illustrated as having 4, 8, and 16 lanes, IO devices 103-110 are not limited to these number of lanes and may have 1 to 64 lanes or more that match the capabilities of each IO device 103-110.

BIOS 150 performs the constructive bifurcation of each port of IO units 112, 114, and 116 to dynamically configure the IO units 112, 114, and 116 based on the specific IO devices 103-110 that are connected to each IO unit 112, 114, and 116 (e.g. IO devices 103-106 that are connected to IO unit 112, IO devices 107-109 that are connected to IO unit 114, and IO device 110 that is connected to IO unit 116), on the device information of each IO device 103-110, and on information of each IO unit 112, 114, and 116 of IO unit configuration table 160, described in further detail below. BIOS 150 can be in one of three modes of operation including a discovery mode of operation, a reboot mode of operation, and a final mode of operation. BIOS 150 maintains and utilizes BIOS mode indicator 151 to indicate which mode of operation it is in. For example, when BIOS mode indicator 151 has a value of "Discovery", BIOS 150 is in discovery mode, when BIOS mode indicator 151 has a value of "Reboot", BIOS 150 is in reboot mode, and when BIOS mode indicator 151 has a value of "Final", BIOS 150 is in final mode. BIOS mode indicator 151 may utilize other values that correspond to discovery mode, reboot mode, and final mode, such as numeric values (e.g. 1-discovery mode, 2-reboot mode, 3-final mode), binary values (e.g. '00'-discovery mode, '01'-reboot mode, '10'-final mode), and the like.

IO unit configuration table 160 includes an entry for each IO unit 112, 114, and 116 of processor 101. Each entry includes IO unit information, bifurcation data, and devices information for the associated IO unit. As shown, IO unit configuration table 160 includes three entries of IO unit information, bifurcation data, and devices information including an IO unit entry 161 associated with IO unit 112, and having IO unit information 171, bifurcation data 172, and devices information 173, an IO unit entry 162 associated with IO unit 114, and having IO unit information 174, bifurcation data 175, and devices information 176, and an IO unit entry 163 associated with IO unit 116, and having IO unit information 177, bifurcation data 178, and devices information 179. IO unit information 171, 174, and 177 includes platform specific lane width policies including lane routing and supported IO devices, an IO unit port identification, a number of lanes supported by its IO unit, a maximum number of root ports having the smallest number of lanes that the IO unit can be fully bifurcated to support, supported bifurcation configurations, bus information for each root port, and the like. Examples of the maximum number of root ports having the smallest number of lanes that an IO unit can support include a 16 lane IO unit bifurcated into 4 root ports of 4 lanes each (4×4), a 16 lane IO unit bifurcated into 8 root ports of 2 lanes each (8×2), a 32 lane IO unit bifurcated into 8×4, 16×2, 4×8, and the like. As such, examples of the supported bifurcation configurations include an IO unit port having a port width of 16 lanes, such as IO unit 112 and 114 that is bifurcated into 4 root ports of 4 lanes each arranged as ×4×4×4×4, into 2 root ports of 4 lanes each and 1 root port of 8 lanes arranged as ×4×4×8, ×4×8×4, or ×8×4×4, into 2 root ports of 8 lanes each arranged as ×8×8, and into 1 root port of 16 lanes arranged as ×16. An IO unit port having a port width of 32 lanes, such as IO unit 116, may support similar bifurcation configurations as the IO unit port having the port width of 16 lanes and also include 1 root port of 32 lanes arranged as ×32.

Bifurcation data 172, 175, and 178 includes a status indicator that indicates whether the bifurcation data has been configured or not, a current configuration of the IO unit having an ordered list of root ports including a root port identification, the number of lanes of each root port, an IO device identification that indicates the IO device that is connected to the root port, and the like. An empty identification is an indication that no IO device is connected to the root port. Devices information 173, 176, and 179 includes a list of IO devices that are connected to the IO unit, and including a device identification, the type of device, the root port identification that the IO device is connected to, IO device width requirements including a required lane width and a maximum lane width, and the like.

In a particular embodiment, information of IO unit configuration table 160 is pre-configured by a pre-configuration process prior to power-on of IHS 100. During the pre-configuration process, an IO unit entry for every IO unit of the processor is created and each entry is pre-configured with its associated information. The IO unit information of each IO unit entry is preconfigured with its specific lane width policies, the IO unit port identification, the number of lanes supported by the IO unit, the maximum number of root ports having the smallest number of lanes that the IO unit can be fully bifurcated to support, and the supported bifurcation configurations. The bifurcation data is cleared to indicate that the bifurcation data has not been found. Similarly, the devices information is cleared to indicate that no devices are connected to the associated IO unit. Here, IO unit configuration table 160 is stored at non-volatile memory of processor 101 (not shown) to allow the information in IO unit configuration table 160 to be maintained during power down, shutdown and reset operations. BIOS 150 utilizes, maintains, and updates the information in IO unit configuration table 160. For example, an IO unit can be pre-configured with a pre-determined number of ports, each with a pre-determined number of lanes.

In another embodiment, IHS 100 is operable to perform constructive bifurcation of 10 units 112, 114, and 116 of processor 101. In constructive bifurcation, one or more of IO units 112, 114, and 116 is bifurcated into its maximum number of root ports having the smallest number of lanes that the IO unit can support, based on the information of IO unit configuration table 160. Here all IO devices 103-110 that are connected to each IO unit s 112, 114, and 116 are discovered, along with the associated devices information. The bifurcation configuration of each port of IO unit s 112, 114, and 116 is updated based on the associated devices information in IO unit configuration table 160. Note that a device may utilize a lane width that is less than the pre-determined number of lanes. Finally, a normal boot process into the operating system is performed with the updated bifurcation configuration of IO unit s 112, 114, and 116 and IO devices 103-110, as described in further detail below.

At power on of IHS 100, processor 101 receives a reset vector that causes processor 101 to be reset and to execute BIOS 150 to begin a boot process. BIOS 150 retrieves information for every IO unit entry, 161-163, including IO unit information 171, 174, and 177, and bifurcation data 172, 175, and 178.

BIOS 150 determines whether the bifurcation data 172, 175, and 178 has been previously found. In response to BIOS 150 determining that bifurcation data 172, 175, and 178 has not been found, BIOS 150 sets BIOS mode indicator 151 to a value that indicates that BIOS 150 is in discovery mode (e.g., "Discovery"). In response to BIOS 150 determining that bifurcation data 172, 175, and 178 has been found, bifurcation data 172, 175, and 178 becomes the current bifurcation data for every IO unit for BIOS 150 utilization.

If BIOS mode indicator 151 has the discovery mode value, BIOS 150 enters discovery mode and fully bifurcates every I/O unit, IO units 112, 114, and 116, based on their corresponding supported bifurcations of IO unit information 171, 174, and 177. BIOS 150 utilizes the maximum number of root ports having the smallest number of lanes that the IO unit can be fully bifurcated to support, based on the supported bifurcations of IO unit information 171, 174, and 177. As shown, BIOS 150 bifurcates IO units 112 and 114 into 4 root ports having 4 lanes each (4×4) and IO unit 116 into 8 root ports of 4 lanes each (8×4). BIOS 150 then saves the associated bifurcation data for every I/O unit at bifurcation data 172, 175, and 178, and makes the bifurcation data the current bifurcation data for every IO unit for BIOS 150 utilization. Next, BIOS 150 applies/configures every IO unit 112, 114, and 116 with the current bifurcation data.

BIOS 150 discovers every device that is connected to each of the IO units 112, 114, and 116. In a particular embodiment, BIOS 150 discovers every device by assigning temporary bus numbers to each of the root ports of each IO unit 112, 114, and 116, and performing a bus enumeration to discover each device that is connected to a specific root port. BIOS 150 retrieves device information from every connected device (e.g. IO devices 103-106 connected to IO unit 112, IO devices 107-109 connected to IO unit 114, and IO device 110 connected to IO unit 116), and determines the bifurcation requirements for every connected device based on each connected device's device information. In a particular embodiment, BIOS 150 retrieves the device information using PCIe capabilities structures in the PCIe configuration space for the device and calculates the device lane width requirements from the retrieved device information. BIOS 150 determines the bifurcation requirements of each connected device based on the supported bifurcation configurations of IO unit information 171, 174, and 177, and utilizing a supported bifurcation configuration that ensures the number of lanes of the supported bifurcation configuration meets or exceeds the device lane width requirements. BIOS 150 updates the current bifurcation data in each IO unit entry 161-163 based on the bifurcation requirements for every connected IO device 103-110, when the bifurcation requirements for a specific device connected to a specific bifurcated port differs from the current bifurcation data.

As shown, IO device 108 has a port width requirement of 8 (×8) and the current bifurcation data of the specific bifurcated root port of IO unit 114 has a lane width of 4 (×4). As such, BIOS 150 updates the current bifurcation data of IO unit entry 162 to have 3 root ports of 4, 8, and 4 lanes each, respectively (1×4, 1×8, and 1×4). Similarly, IO device 110 has a port width requirement of 16 (×16) and the current bifurcation data of the specific bifurcated root port of IO unit 114 has a lane width of 4 (×4). As such, BIOS 150 updates the current bifurcation data of IO unit entry 163 to have 1 root port of 16 lanes (1×16), and 4 root ports of 4 lanes each (4×4), respectively (1×16 and 4×4). As shown, IO devices 103-106 have port width requirements of 4 (×4) and the current bifurcation data of the specific bifurcated root ports of IO unit 112 have lane widths of 4 (4×4). As such, the port width requirements of IO devices 103-106 match the current bifurcation data of IO unit 112 and no update by BIOS 150 is needed. BIOS 150 saves the updated current bifurcation data for every I/O unit at bifurcation data 172, 175, and 178 of its corresponding IO unit entries 161-163. BIOS 150 also updates the current device data for every I/O unit based on each connected device's device information and saves the updated current device data at devices information 173, 176, and 179 of each connected device's corresponding IO unit entries 161-163.

BIOS 150 sets BIOS mode indicator 151 to the reboot mode value. When BIOS mode indicator 151 has the reboot mode value, BIOS 150 is in reboot mode, and BIOS 150 discovers every device that is connected to each of the IO units 112, 114, and 116, retrieves device information from every connected device, updates the current device data for every I/O unit based on each connected device's device information, saves the updated current device data at devices information 173, 176, and 179 of each connected device's corresponding IO unit entries 161-163, as previously described. BIOS 150 then saves the current bifurcation data for every I/O unit at bifurcation data 172, 175, and 178 of its corresponding IO unit entries 161-163 and causes a reset to occur so that the IO units 112, 114, and 116 can be re-configured to support the bifurcation configuration changes as described above.

BIOS 150 sets BIOS mode indicator 151 to the final mode value. Finally, when BIOS 150 is in final mode, BIOS 150 detects whether any device changes have been made or not, where BIOS 150 detects device changes by comparing the current device data for every I/O unit of each connected device with devices information 173, 176, and 179 of each connected device's corresponding IO unit entries 161-163 to determine if any connected device has been added or removed from any IO unit 112, 114, or 116. In a particular embodiment, BIOS 150 also detects devices changes by determining that firmware of the IHS 100 has been updated. In response to BIOS 150 detecting that any connected device has been changed (e.g. added or removed) and/or the firmware has been updated, BIOS 150 sets BIOS mode indicator 151 to a value that indicates that BIOS 150 is in discovery mode (e.g., "Discovery") and causes a reset to occur so that the IO units 112, 114, and 116 can be re-configured to support the devices changes as described above.

BIOS 150 continues with normal boot process including full bus enumeration and assignment of permanent bus resources to boot to the operating system.

In this manner, the IO units of the processors of the IHS start with a bifurcation configuration having the maximum number of root ports having the smallest number of lanes and constructing upwards to automatically find all the possible connected devices. Prior knowledge and IO unit to device mapping built into the BIOS image is not required, allowing dynamic device discovery and IO unit configuration. Manual entry of configuration data is not required and firmware updates are not required to update information of the IO unit configuration table, resulting in dynamic device discovery and configuration and forward compatibility with new hardware capabilities and devices. This allows the IHS to be dynamically tuned by moving devices to different IO unit slots to optimize the performance of the IHS. This also provides the flexibility to choose which IO unit slot a particular device is connected to.

When one or more of IO unit 112, 114, and 116 represent PCIe units, the port of IO unit 112 will be understood to represent a first PCIe slot that has 16 lanes and the interconnects 120-123 represent the connection to a first PCIe adapter card that also has 16 lanes. Here, IO devices 103-106 represent PCIe devices that are configured on a first PCIe adapter card. Each IO device 103-106 is connected to IO unit 112 via the first PCIe adapter card represented by interconnects 120-123, respectively. Similarly, the port of IO unit 114 will be understood to represent a second PCIe slot that has 16 lanes and the interconnects 124-127 represent the connection to a second PCIe adapter card that also has 16 lanes. IO devices 103-106 are PCIe devices that are connected to the second PCIe adapter card. Each IO device 107-109 is connected to IO unit 112 via the second PCIe adapter card represented by interconnect 124, combined interconnects 125 and 126, and interconnect 127, respectively. Similarly, the port of IO unit 116 will be understood to represent a third PCIe slot that has 16 lanes and the interconnects 128-135 represent the connection to a third PCIe adapter card that also has 32 lanes. IO device 110 is a PCIe device that is connected to the third adapter card. IO device 110 is connected to IO unit 116 via the third PCIe adapter card represented by combined interconnects 128-131.

FIGS. 2 and 3 illustrate a method 200 for constructive bifurcation of I/O unit (IO unit) ports in information handling system 100 of FIG. 1, where the exemplary method 200 begins at block 202 where a reset vector is received at a processor, such as processor 101, that causes processor 101 to be reset and to execute BIOS 150 to begin a boot process of processor 101.

At block 204, BIOS 150 retrieves information for every IO unit entry, such as IO unit entries 161-163, of IO unit configuration table 160 of processor 101 including IO unit status information and bifurcation data (e.g. status information of IO unit information 171, 174, and 177 and bifurcation data 172, 175, and 178).

At decision block 206, BIOS 150 determines whether the bifurcation data 172, 175, and 178 of each IO unit entry 161-163 of IO unit configuration table 160 has been previously found. If BIOS 150 determines that bifurcation data 172, 175, and 178 has not been found, the "No" Branch of decision block 206 is taken and method 200 proceeds to block 208 where BIOS 150 sets BIOS mode indicator 151 to a value that indicates that BIOS 150 is in discovery mode and the method proceeds to block 210. If BIOS 150 determines that bifurcation data 172, 175, and 178 has been found, bifurcation data 172, 175, and 178 becomes the current bifurcation data for each IO unit entry 161-163, and the "Yes" Branch of decision block 206 is taken and method 200 proceeds to block 210.

At decision block 210, BIOS 150 determines whether BIOS 150 is in discovery mode or not. If BIOS 150 determines that BIOS 150 is in discovery mode, the "Yes" Branch of decision block 210 is taken and method 200 proceeds to block 212. At block 212, BIOS 150 fully bifurcates each IO unit 112, 114, and 116, based on their corresponding supported bifurcations of IO unit information 171, 174, and 177, saves the bifurcation data at bifurcation data 172, 175, and 178 of its corresponding IO unit entry 161-163, makes the bifurcation data the current bifurcation data for each IO unit 112, 114, and 116, and method 200 proceeds to block 214. If BIOS 150 determines that BIOS 150 is not in discovery mode, the "No" Branch of decision block 210 is taken and method 200 proceeds to block 214. At block 214, BIOS 150 applies/configures each IO unit 112, 114, and 116 with the current bifurcation data and method 200 proceeds to block 216.

At decision block 216, BIOS 150 determines whether BIOS 150 is in discovery mode or not. If BIOS 150 determines that BIOS 150 is in discovery mode, the "Yes" Branch of decision block 216 is taken and method 200 proceeds to block 218. If BIOS 150 determines that BIOS 150 is not in discovery mode, the "No" Branch of decision block 216 is taken and method 200 proceeds to block 222.

At block 218, BIOS 150 discovers every IO device 103-110 that is connected to each IO unit 112, 114, and 116, retrieves device information from every connected IO device 103-110, and determines the bifurcation requirements for every connected IO device 103-110 based on each connected IO device 103-110 devices information 173, 176, and 179. As shown if FIG. 1, IO devices 103-106 are connected to IO unit 112, IO devices 107-109 are connected to IO unit 114, and IO device 110 is connected to IO unit 116. BIOS 150 updates the current bifurcation data for each IO unit 112, 114, and 116, based on the bifurcation requirements for every connected IO device 103-110, when the bifurcation requirements for a specific device connected to a specific bifurcated port differs from the current bifurcation data. For example, IO device 108 has a port width requirement of ×8 and the current bifurcation data of the specific bifurcated port of IO unit 114 has a width of ×4. As such, the bifurcation requirements for IO device 108 connected to a specific bifurcated port of IO unit 114 differs from the current bifurcation data. BIOS 150 saves the updated current bifurcation data at bifurcation data 172, 175, and 178. BIOS 150 also updates the current IO device 103-110 data based on each connected IO device's 103-110 device information and saves the updated current device data at devices information 173, 176, and 179 and method 200 proceeds to block 220. At block 220, BIOS 150 sets BIOS mode indicator 151 to a value that indicates that BIOS 150 is in reboot mode and the method proceeds to block 228.

At decision block 222, BIOS 150 determines whether BIOS 150 is in reboot mode or not. If BIOS 150 determines that BIOS 150 is in reboot mode, the "Yes" Branch of decision block 222 is taken and method 200 proceeds to block 224. If BIOS 150 determines that BIOS 150 is not in reboot mode, the "No" Branch of decision block 222 is taken and method 200 proceeds to block 228.

At block 224, BIOS 150 discovers every device that is connected to each of the IO units 112, 114, and 116, retrieves device information from every connected device, updates the current device data for each IO unit 112, 114, and 116 based on each connected IO device's 103-110 device information, saves the updated current device data at devices information 173, 176, and 179, and method 200 proceeds to block 226. At block 226, BIOS 150 sets BIOS mode indicator 151 to a value that indicates that BIOS 150 is in final mode and the method proceeds to block 228.

At decision block 228, BIOS 150 determines whether BIOS 150 is in final mode or not. If BIOS 150 determines that BIOS 150 is not in final mode, the "No" Branch of decision block 228 is taken and method 200 proceeds to block 230 where BIOS 150 saves the current bifurcation data for each IO unit 112, 114, and 116 at bifurcation data 172, 175, and 178, and method proceeds back to block 202. If BIOS 150 determines that BIOS 150 is in final mode, the "Yes" Branch of decision block 228 is taken and method 200 proceeds to block 232.

At decision block 232, BIOS 150 detects whether any device changes have been made or not. BIOS 150 detects device changes by comparing the current device data of each connected device for every IO unit 112, 114, and 116 with devices information 173, 176, and 179 to determine if any connected device has been added or removed from any IO unit 112, 114, or 116. BIOS 150 may also detect devices changes by determining that firmware of the IHS 100 has been updated. If BIOS 150 detects that any connected device has been changed (e.g. added or removed) and/or the firmware has been updated, the "Yes" Branch of decision block 232 is taken and method 200 proceeds to block 234 where BIOS 150 sets BIOS mode indicator 151 to a value that indicates that BIOS 150 is in discovery mode and the method proceeds back to block 202. If BIOS 150 does not detect any connected device changes, the "No" Branch of decision block 232 is taken and method 200 proceeds to block 236. At block 236, BIOS 150 continues with a normal boot process including full bus enumeration and assignment of permanent bus resources to boot to the operating system.

Figure 4:
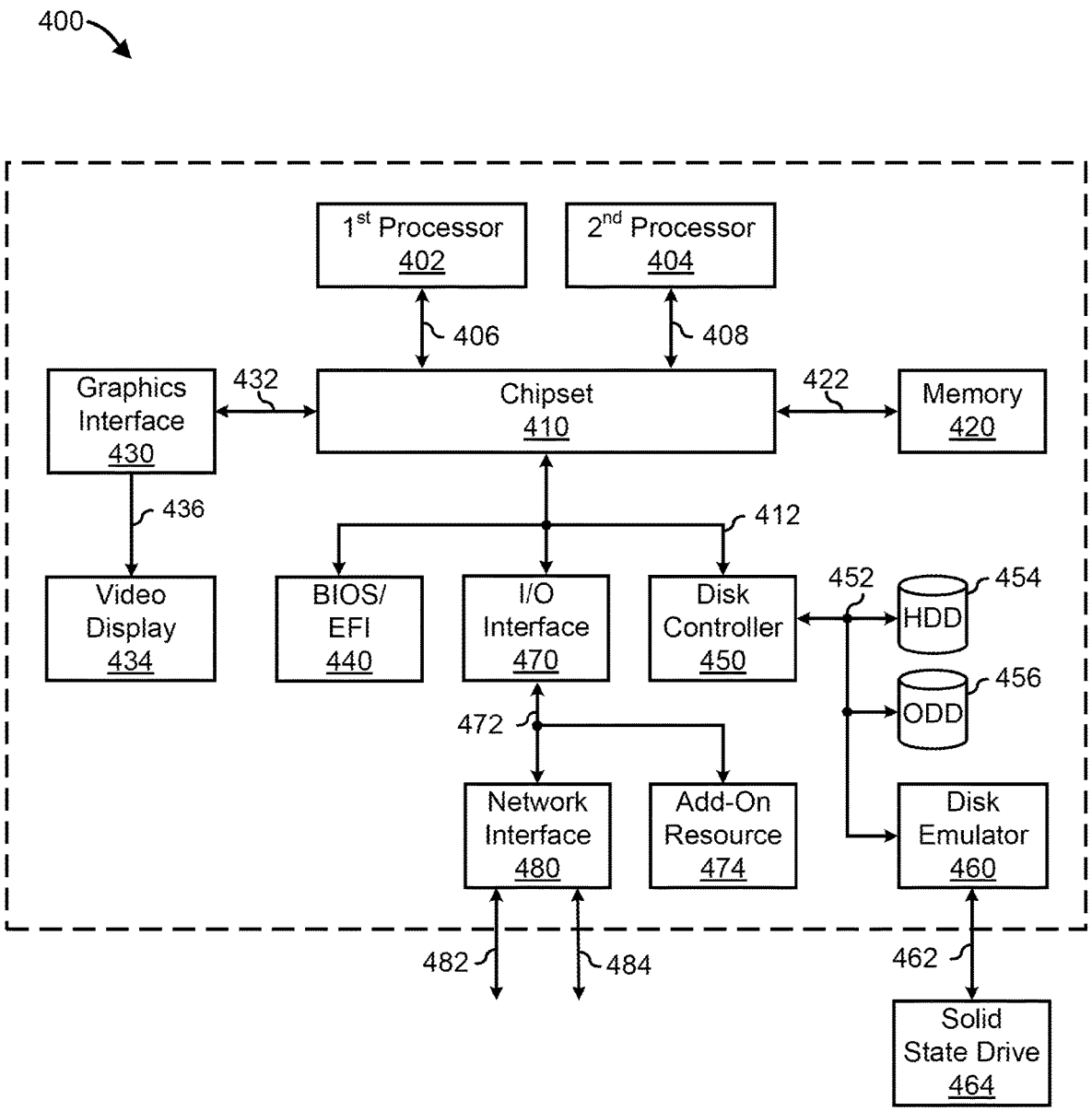
FIG. 4 is a block diagram illustrating a generalized information handling system according to an embodiment of the present disclosure.

FIG. 4 illustrates a generalized embodiment of information handling system 400. For purpose of this disclosure information handling system 400 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a Central Processing Unit (CPU), a Programmable Logic Array (PLA), an embedded device such as a System-On-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various Input and Output (I/O) devices, such as a keyboard, a mouse, and a video display. Information handling system 400 can also include one or more buses operable to transmit information between the various hardware components.

Information handling system 400 can include devices or modules that embody one or more of the devices or modules described above, and operates to perform one or more of the methods described above. Information handling system 400 includes processors 402 and 404, a chipset 410, a memory 420, a graphics interface 430, include a Basic Input Output System/Extensible Firmware Interface (BIOS/EFI) module 440, a disk controller 450, a disk emulator 460, an Input/Output (I/O) interface 470, and a network interface 480. Processor 402 is connected to chipset 410 via processor interface 406, and processor 404 is connected to the chipset via processor interface 408. Memory 420 is connected to chipset 410 via a memory bus 422. Graphics interface 430 is connected to chipset 410 via a graphics interface 432, and provides a video display output 436 to a video display 434. In a particular embodiment, information handling system 400 includes separate memories that are dedicated to each of processors 402 and 404 via separate memory interfaces. An example of memory 420 includes Random Access Memory (RAM) such as Static RAM (SRAM), Dynamic RAM (DRAM), Non-Volatile RAM (NV-RAM), or the like, Read Only Memory (ROM), another type of memory, or a combination thereof.

BIOS/EFI module 440, disk controller 450, and I/O interface 470 are connected to chipset 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 440 includes BIOS/EFI code operable to detect resources within information handling system 400, to provide drivers for the resources, initialize the resources, and access the resources. BIOS/EFI module 440 includes code that operates to detect resources within information handling system 400, to provide drivers for the resources, to initialize the resources, and to access the resources. BIOS/EFI code also includes code that operates to perform constructive bifurcation of I/O unit (IO unit) ports of information handling system 400.

Disk controller 450 includes a disk interface 452 that connects the disc controller to a Hard Disk Drive (HDD) 454, to an Optical Disk Drive (ODD) 456, and to disk emulator 460. An example of disk interface 452 includes an Integrated Drive Electronics (IDE) interface, an Advanced Technology Attachment (ATA) such as a Parallel ATA (PATA) interface or a Serial ATA (SATA) interface, a SCSI interface, a USB interface, a proprietary interface, or a combination thereof. Disk emulator 460 permits a solid-state drive 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O interface 470 includes a peripheral interface 472 that connects the I/O interface to an add-on resource 474 and to network interface 480. Peripheral interface 472 can be the same type of interface as I/O channel 412, or can be a different type of interface. As such, I/O interface 470 extends the capacity of I/O channel 412 when peripheral interface 472 and the I/O channel are of the same type, and the I/O interface translates information from a format suitable to the I/O channel to a format suitable to the peripheral channel 472 when they are of a different type. Add-on resource 474 can include a data storage system, an additional graphics interface, a Network Interface Card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as chipset 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   detecting, by a hardware processor of an information handling system, that a basic input output system (BIOS) is set in a discovery mode based on a value of a BIOS indicator;
   detecting, by the hardware processor, a communication via a configurable input/output port with an input/output device;
   in response to determining that the basic input output system is set in the discovery mode based on the value of the BIOS indicator, bifurcating, by the processor, an I/O unit of the information handling system into a first root port, a second root port, and a third root port;
   storing, by the hardware processor, a bifurcation table that electronically associates bifurcation data to input/output ports including the configurable input/output port;
   identifying, by the hardware processor, the bifurcation data that is electronically associated by the bifurcation table to the configurable input/output port;
   identifying, by the hardware processor, a first lane width of the bifurcation data that is electronically associated by the bifurcation table to the configurable input/output port; and
   bifurcating, by the hardware processor, the configurable input/output port according to the lane width identified by the bifurcation table.

2. The method of claim 1, further comprising:
   discovering, by the hardware processor, a second input/output device communicating via a second configurable input/output port; and
   in response to discovering the second input/output device, identifying, by the hardware processor, a second lane width of the bifurcation data that is electronically associated by the bifurcation table to the second configurable input/output port.

3. The method of claim 1, further comprising determining an empty entry of the bifurcation data in the bifurcation table.

4. The method of claim 3, further comprising determining the input/output device is no longer in the communication via the configurable input/output port in response to the empty entry of the bifurcation data in the bifurcation table.

5. The method of claim 3, further comprising determining the input/output device is not connected via the configurable input/output port in response to the empty entry of the bifurcation data in the bifurcation table.

6. The method of claim 1, further comprising identifying a lane width policy of the bifurcation data that is electronically associated by the bifurcation table to the configurable input/output port.

7. The method of claim 1, further comprising identifying a maximum lane width of the bifurcation data that is electronically associated by the bifurcation table to the configurable input/output port.

8. The method of claim 1, further comprising configuring the bifurcation table prior to electrically powering the information handling system.

9. The method of claim 1, further comprising identifying a smallest number of lanes of the bifurcation data that is electronically associated by the bifurcation table to the configurable input/output port.

10. The method of claim 1, further comprising clearing the bifurcation data to indicate the bifurcation data is unknown.

* * * * *